United States Patent

Will

[19]

[11] Patent Number: 5,892,817
[45] Date of Patent: *Apr. 6, 1999

[54] WIRELESS SYSTEM FOR ALERTING INDIVIDUAL TO INCOMING TELEPHONE CALL

[76] Inventor: Craig Alexander Will, 2110 Paul Edwin Ter. #101, Falls Church, Va. 22043

[ * ] Notice: This patent issued on a continued prosecution application filed under 37 CFR 1.53(d), and is subject to the twenty year patent term provisions of 35 U.S.C. 154(a)(2).

[21] Appl. No.: 500,408

[22] Filed: Jul. 10, 1995

[51] Int. Cl.$^6$ .................................................. H04M 11/00
[52] U.S. Cl. ....................... 379/102.02; 379/373; 379/418
[58] Field of Search .................................. 379/56, 57, 58, 379/61, 62, 63, 102, 104, 105, 90, 110, 102.01, 102.02, 102.07, 90.01, 110.01, 201, 210, 211, 212, 373, 418; 455/414, 415, 417, 426, 456, 458, 31.2, 31.3, 462, 461; 340/825.44, 825.46

[56] References Cited

U.S. PATENT DOCUMENTS

| | | | |
|---|---|---|---|
| 3,439,320 | 4/1969 | Ward | 340/16 |
| 3,657,715 | 4/1972 | Curtin | 340/311 |
| 3,696,384 | 10/1972 | Lester | 340/312 |
| 3,805,265 | 4/1974 | Lester | 343/6.5 R |
| 4,076,968 | 2/1978 | Wattenbarger | 179/84 R |
| 4,542,262 | 9/1985 | Ruff | 179/2 E |
| 4,794,649 | 12/1988 | Fujiwara | 455/343 |
| 4,823,123 | 4/1989 | Siwiak | 340/825.44 |
| 4,969,180 | 11/1990 | Watterson et al. | 379/58 |
| 5,111,499 | 5/1992 | Umemoto et al. | 455/462 |
| 5,140,626 | 8/1992 | Ory et al. | 379/201 |
| 5,151,930 | 9/1992 | Hagl | 379/57 |
| 5,222,123 | 6/1993 | Brown et al. | 379/58 |
| 5,315,636 | 5/1994 | Patel | 455/461 |
| 5,469,496 | 11/1995 | Emery et al. | 455/414 |
| 5,515,426 | 5/1996 | Yacenda et al. | 455/456 |
| 5,673,308 | 9/1997 | Akhavan | 455/462 |

Primary Examiner—Stella Woo

[57] ABSTRACT

A system for alerting some individuals in a large open space such as a store or restaurant to an incoming telephone call, but that avoids disturbing other individuals by loud ringing. Individuals carry miniature alerting units that are clipped to their clothing and that can also serve as identification badges. An incoming telephone call is received by a telephone ringer control which transmits a signal by a wireless medium to an alerting unit, which emits a low-level auditory (or vibratory or visual) signal to alert the user, and also transmits an acknowledgment signal by the same wireless medium back to the telephone ringer control. If such an acknowledgment signal is not received within a short time period at the telephone ringer control, a loud auditory ringing signal is broadcast. The acknowledgment signal—and resulting loud ring if it is not received—ensures that individuals will always be alerted to an incoming call, even if an individual forgets to carry an alerting unit or an alerting unit fails to operate because of an obstruction in the transmission path or a drained battery.

2 Claims, 4 Drawing Sheets

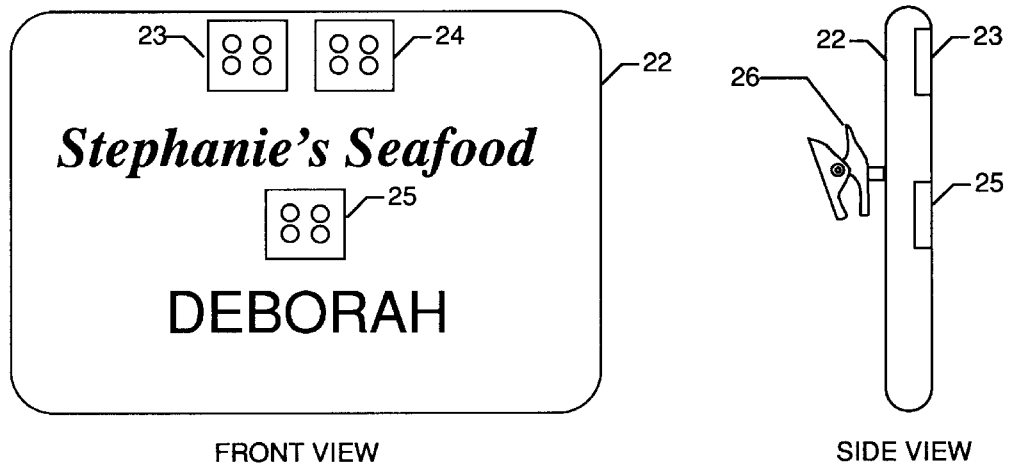
FRONT VIEW　　　　　　　　SIDE VIEW
*FIG. 3a*　　　　　　　　*FIG. 3b*
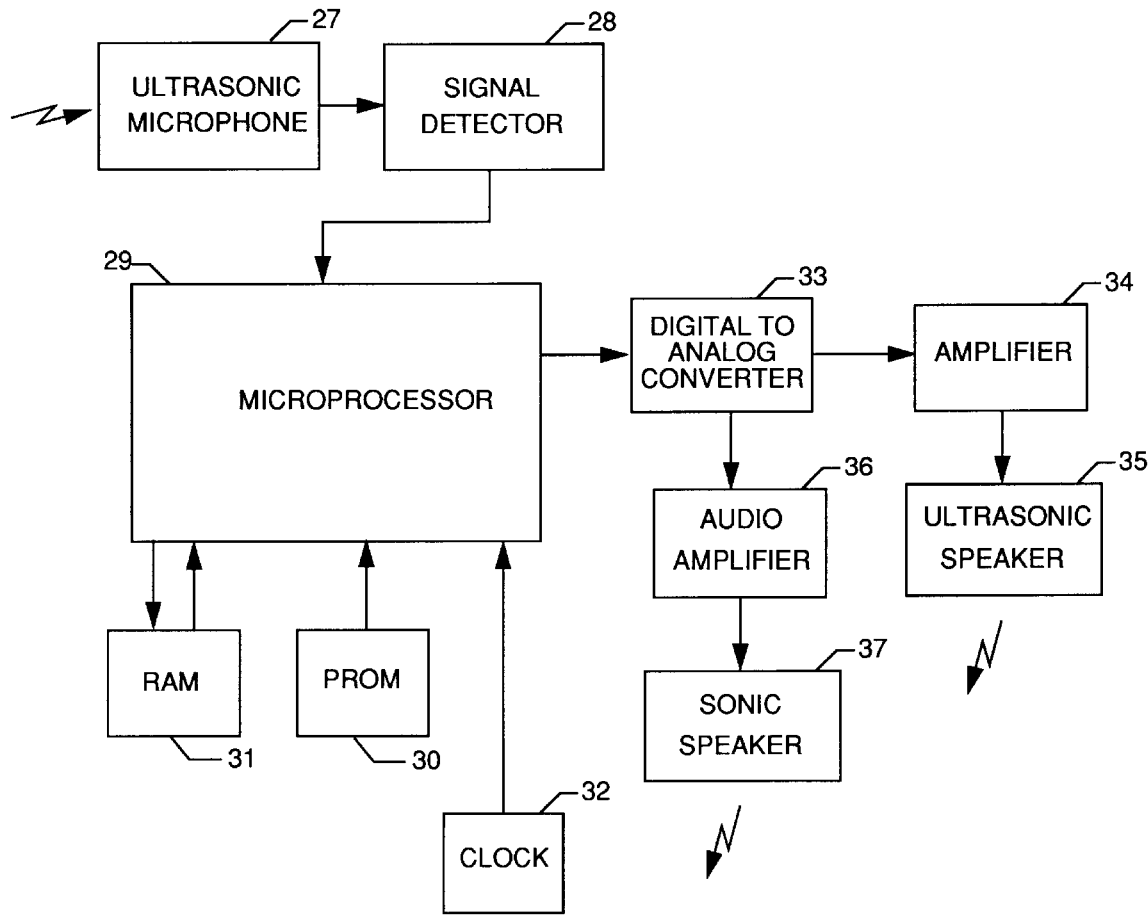
*FIG. 4*

WIRELESS SYSTEM FOR ALERTING INDIVIDUAL TO INCOMING TELEPHONE CALL

FIELD OF THE INVENTION

The invention disclosed here relates generally to alerting signals indicating the receipt of a telephone call at a telephone system subscriber substation where the alerting function is performed at the subscriber terminal, in which an audible alerting signal is generated at a subscriber terminal by electronic means, and also where there is a visible or vibratory indication of the alerting signal. The invention also relates to alerting or paging systems using the media of ultrasonic sound, infrared light, or radio. More specifically, the invention relates to a system in which alerting units are carried by individuals, who are alerted by auditory, visual, or vibratory signals generated when a wireless transmission is received that is transmitted as the result of a ringing signal having been received at a telephone subscriber terminal.

BACKGROUND

In many environments, it is desirable for some individuals to be made aware of incoming telephone calls, but at the same time undesirable for others to be disturbed by the loud ringing that typically results with some present-day installations. In environments such as restaurants, bookstores, department stores, libraries, etc., it is often the case that it is necessary for loud ringing to permeate the atmosphere. In some cases, ringing signals resulting from incoming telephone calls are broadcast over a public address system so as to insure that they will be heard, which can be annoying and unpleasant for customers, particularly when the calls are not answered, which often happens.

This problem is on the surface solvable by making use of some form of paging receiver that is carried by individuals, such as the paging receivers now commonly used by individuals outside of a building. Several drawbacks result from such an approach, however. Radio is relatively expensive because of the cost of paging receivers, and also requires substantial energy, limiting battery life. In addition, radio bandwidth is required, involving possible licensing or the need to deal with paging companies (and paying monthly service fees), and also raising the possibility of signal delays that could substantially delay the receipt of a paging signal after a ring was received.

An alternative is the use of some other medium that is particularly useful within a building. Thus, for example, the Curtin invention (U.S. Pat. No. 3,657,715) discloses a paging system for use in a building using ultrasound, in which an ultrasonic signal at a frequency unique to a given individual is transmitted over a power line to a set of transducers that converts the signal to sound and is received at an ultrasonic detector carried by an individual. Similar systems, including those by Lester (U.S. Pat. Nos. 3,696, 384, 3,805,227, and 3,805,265) disclose variations that use ultrasound and other media, sometimes in combination, including infrared light, radio, baseband wire, or other media, to allow paging of individuals. Such systems typically also allow tracking individuals, with the Ward invention (U.S. Pat. No. 3,439,320) using ultrasound for tracking the location of individuals and routing incoming telephone calls to the room that a given individual is in when the call arrives.

The primary problem with such systems is the potential for failure. Potential customers of such systems are reluctant to buy them if there is any possibility of failure. Failure is not just a matter of factors that impair transmission, such as electromagnetic interference or shielding that might impair radio waves, visual obstructions that might impair infrared light, or auditory obstructions that might impair ultrasound. Failure of a system also results when a user forgets to carry the unit on a particular day, or leaves it on one's desk when at lunch and then forgets to carry it after lunch, or goes out to the parking lot and takes the unit with him or her. Failure can also result from a drained battery or defective electronics. It is a primary object of the present invention to provide a system that is "fail safe" and will always result in effective alerting of users to an incoming telephone call regardless of any of these forms of failure.

An invention by Brown, et al. (U.S. Pat. No. 5,222,123) has some similarity in mechanism to the present invention. Brown, et al. discloses a cordless telephone system that redirects calls. A user who desires to be reached at another location will program that location to expect the user at a certain time. When a caller places a call to the user, the central office will redirect the call to a base station, which sends a polling signal by radio to the cordless telephone. In the embodiment most similar to the present invention, of the cordless telephone is near the base station, it will respond and a call will be set up. However, if the cordless telephone does not respond, the base station will so indicate and the central station will redirect the call to a different location, such as the location the original call was placed to. The present invention is directed to receiving calls at a single fixed location and insuring that at least one individual will be alerted to such an incoming call.

Another invention by Emery, et al. (U.S. Pat. No. 5,469, 496) also has some similarity to the present invention. Emery, et al. discloses a system for integrating wired and wireless telephone systems, in particular cordless telephones that have a base station unit that is connected to the wired telephone system. Emery, et al. is particularly concerned with providing flexibility in routing calls and in routing calls in a manner customized to the particular needs of individuals. In the version of the Emery, et al. invention most similar to the present invention, a base station sends a signal to a cordless handset, with the handset responding by indicating that the handset is busy (e.g., already on a call), is ringing, or is unavailable (out of range). In the case of the handset ringing, the base station waits for a certain specified number of rings and then, if the handset has not answered, the call is redirected to a different line or service, such as transferring the call to a secretary's line or to a voicemail system or answering machine. In contract, the goal of the present invention is to insure that the alerting signal resulting from an incoming call is effectively and quickly (and quietly, if possible) transmitted so as to notify an individual or individuals that the incoming call has arrived, even if they forgotten to wear their alerting device or it has malfunctioned. In the present invention, the incoming call is accepted on the same line and at the same telephone station regardless of whether the individual is alerted by a signal from a wearable alerting unit or by a broad range auditory ringer. The call itself is not rerouted if the alerting unit does not respond.

SUMMARY OF THE INVENTION

The goal of the invention disclosed here is to provide a means for indicating an incoming telephone call to some individuals, but in such a way as to avoid disturbing other individuals, such as customers in a store, who have no need or desire to be interrupted by a loud ringing. This system is designed specifically for applications in which a group of people are responsible for answering a single telephone line.

In the system, individuals carry miniature alerting (i.e., paging) units that are typically clipped to their clothing and that typically also serve as identification badges. The alerting units, when activated by a wireless signal indicating an incoming telephone call, emit a much quieter and more localized auditory ringing signal than the present practice of broadcasting a loud ringing signal throughout the environment. If complete silence is desired, a visual or vibratory signal is emitted by the alerting unit. When an incoming telephone call arrives, the ringing signal on the subscriber line is received by a telephone ringer control mechanism, which transmits a wireless signal indicating the ring using ultrasonic sound (or, in alternate embodiments, infrared light or radio). When an alerting unit receives the wireless signal, it emits both a local signal to alert the user and an acknowledgment signal, using ultrasound (or infrared or radio) back to the ringer control. If such an acknowledgment signal is not received within a short period of time at the ringer control, that mechanism transmits the same loud ringing signal that would be generated normally if the present invention were not used. The acknowledgment signal—and resulting loud ring if it is not received—ensures that users will always be alerted to incoming calls, even if users happen to forget to clip on alerting units or if alerting units fail to operate because of some obstruction in the transmission path, a drained battery, or other failure. In addition, if an alerting unit is not clipped to the clothing of a user or otherwise correctly activated, an automatic switch disables the unit so that it neither emits a ringing signal nor transmits an acknowledgment signal back to the ringer control. This prevents a failure to alert should a user forget to clip on an alerting unit but leaves it in the area so that it can respond with an acknowledgment signal but not alert the user.

BRIEF DESCRIPTION OF THE DRAWINGS

FIGS. 3a and 3b show different physical views of an alerting unit.

FIG. 4 shows the hardware architecture of the alerting unit.

DESCRIPTION OF THE PREFERRED EMBODIMENTS

Figure 1:
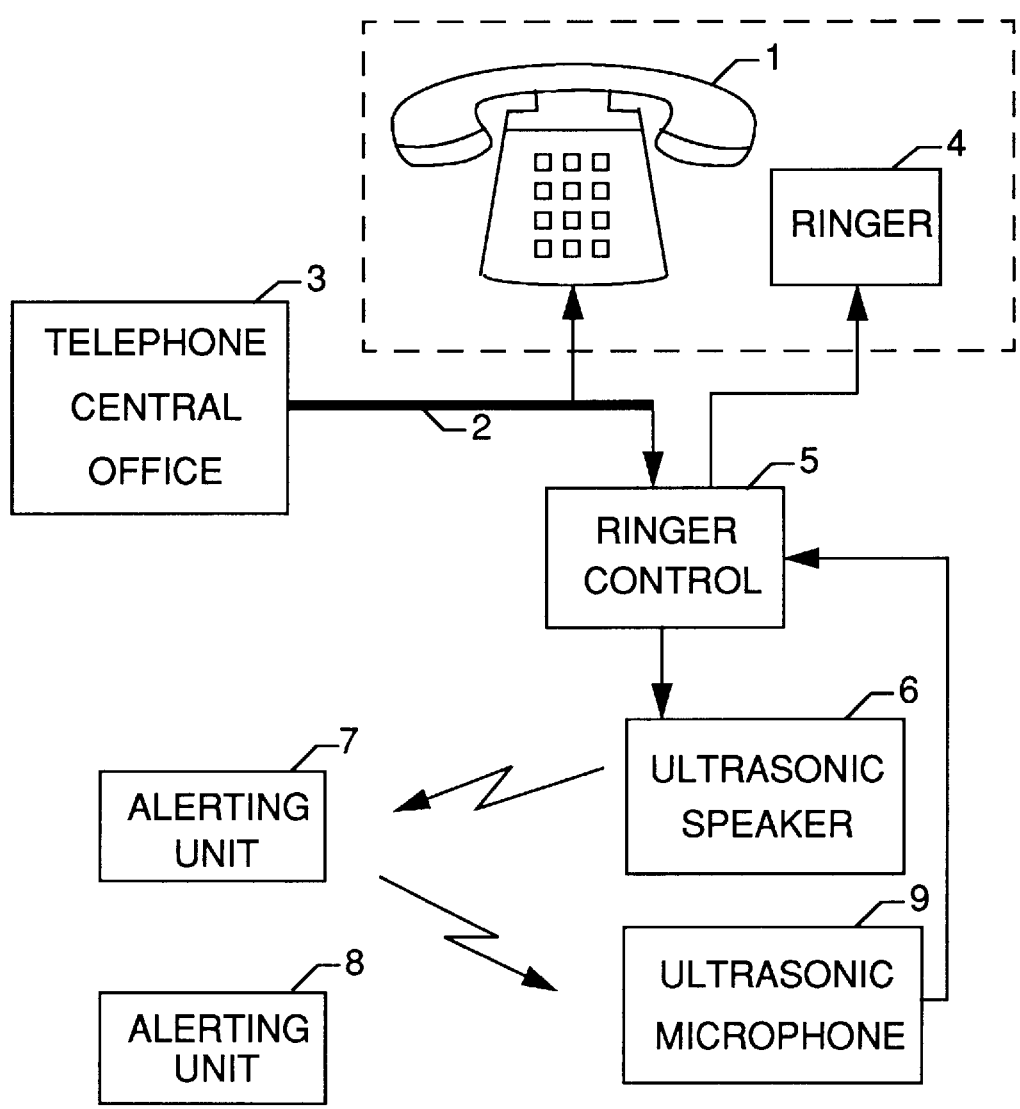
FIG. 1 shows the overall architecture of the system.

FIG. 1 shows the overall architecture of the system. A telephone instrument 1 is connected to a telephone subscriber line 2 that comes from a telephone central office 3. The ringer 4 associated with the telephone instrument has been disconnected so that is no longer directly activated from the subscriber line 2. The telephone subscriber line 2 also feeds into a telephone ringer control mechanism 5, which senses a ringing signal on the subscriber line 2 and, when detected, broadcasts a wireless ringing signal via ultrasound from the ultrasonic speaker 6, which is received by alerting units 7 and 8. The number of alerting units in a system can vary from 1 to 64 or more.

An alerting unit (e.g., 7) receives the wireless ringing signal via ultrasound and generates a ringing indication perceptible to the user, via an auditory, visual, or vibratory mode. The alerting unit also transmits an acknowledgment signal, again via ultrasound, back to the telephone ringer control 5 via the ultrasonic microphone 9. The telephone ringer control 5, when it detects a ringing signal from the subscriber line, starts a timer. If a given fixed waiting period has elapsed without receipt of an acknowledgment signal from at least one alerting unit, then the telephone ringer control 5 will generate the same ringing signal that would otherwise be transmitted directly from the subscriber line and transmit it to the ringer 4. That is, if an acknowledgment signal from an unit is not received, the telephone ringer 4 would ring as it normally would if the wireless call-indicating system was not installed. The ringer 4 may be the normal ringer in a telephone instrument or an amplified version, such as a system that broadcasts the audio ringing system over a loudspeaker system. In the standard arrangement, each incoming ringing signal at the telephone subscriber line is handled independently of others. However, alternatives exist that reduce the tendency of the normal loud auditory ringing signal to be generated, but at some increased risk of an incoming call being ignored. These alternatives require the identification of the first ring and last ring of a call. In one alternative, then, receipt of an acknowledgment signal for any ring of a given call at the ringer control 5 suppresses the normal loud auditory ringing signal for the remaining rings of the call, regardless of whether further acknowledgment signals are received. A variation on this suppresses at least one further ring, according to some algorithm. Thus, for example, receipt of an acknowledgment signal could suppress the ring just following, but not the ring following that unless an acknowledgment signal is received for either ring. The system also keeps track of the sequence of rings for a particular call, based on the standard cadence of rings in which a ringing signal is transmitted for a duration of 2 seconds, followed by a period of silence between rings with a duration of 4 seconds. The last ring of a call is identified when the period of silence lasts more than 4 seconds. Similarly, the first ring of a new call is identified when a last ring of a call has been identified and an additional ring occurs. (It may also be necessary to declare a ring occurring less than 4 seconds after the end of the previous ring to be the first ring of a new call and the previous ring to be the last ring of the previous call.)

In an alternate embodiment, infrared light is used instead of ultrasound as the communications medium for transmission from the ringer control to the alerting units and from the alerting units back to the ringer control. In this case the ultrasonic speaker 6 is replaced with an infrared emitter, and the ultrasonic microphone 9 is replaced with an infrared detector.

In an second alternate embodiment, radio is used instead of ultrasound as the communications medium for transmission from the ringer control to the alerting units and from the alerting units back to the ringer control. In this case the ultrasonic speaker 6 is replaced with a radio transmitter and antenna, and the ultrasonic microphone 9 is replaced with an antenna and radio receiver.

All three of the media that could be used in the alternate embodiments indicated above, including ultrasound, radio, and infrared light, form a class of media for the transmission of information that share the common property of providing that transmission path by means of the propagation of energy in the form of waves, allowing communication through the air without the necessity of wires or other physical cables.

Figure 2:
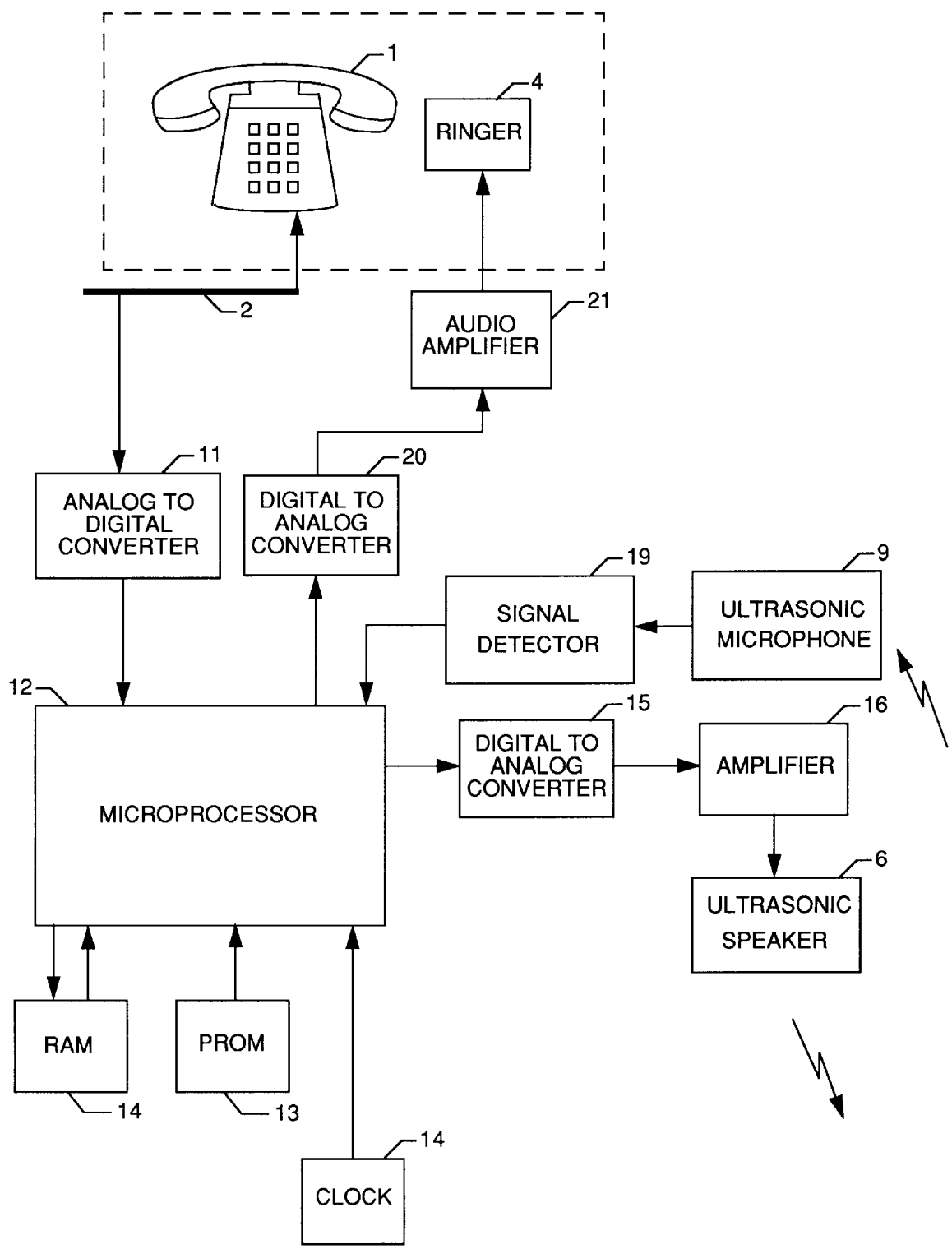
FIG. 2 shows the architecture of the ringer control unit.

FIG. 2 shows the architecture of the ringer control unit. The telephone instrument 1 is connected to the telephone subscriber line, as is an analog-to-digital converter 11, which converts the analog amplitude of the telephone line to an 8-bit digital code and supplies it to a microprocessor 12. (The analog to digital converter 11 could be replaced if desired by a resistor and capacitor in series, followed by a diode, or set of 4 diodes in a bridge. to rectify the a.c. ringing voltage, followed by a d.c. smoothing capacitor.) The microprocessor has associated with it a programmable read only memory (PROM) 13, which contains the computer program for the microprocessor and values of sine-wave signals for the ultrasonic signal at 40 kHz, the transmitting frequency for the wireless ringing signal, and for an auditory ringing signal at 20 Hz. The microprocessor also has a random access memory (RAM) 14, which stores temporary values of the signals it is processing, clock times, and control information. Also included in the ringer control is a real time clock 14 operating at 2 MHz. The microprocessor 12, when it has detected a ring (a 16–60 Hz signal, nominal frequency 20 Hz) by processing the signal input via the analog to digital converter 11, generates a digital form of a sine wave ultrasonic signal for 1 millisecond, at a rate of 40 kHz, which is converted to analog by a 8-bit digital to analog converter 15, amplified by an ultrasonic audio amplifier 16, and transmitted by an ultrasonic speaker (transducer) 6. The response from a unit, if it comes, appears at the ultrasonic microphone 9, and is processed by a signal detector 19, which consists of an active bandpass filter centered around 48 kHz, the receiving frequency for the ringer control, and an integrator and threshold detector, the output of which is supplied to the microprocessor 12. Should there be a response (acknowledgment signal) within the given period of time after transmission of the current ring, (or should there have been a response for any ring during the current call, or for some proportion of rings depending upon which option is used), no further action is taken and the ring control unit returns to monitoring the telephone subscriber line for further rings. If there is no response, the microprocessor 12 generates a ringing signal, converts it to analog with an 8-bit digital to analog converter 20, amplifies it with an audio amplifier 21, and supplies it to the telephone ringer 4. The time period that the ringer control waits for a response is not very critical, but must be long enough to allow for propagation of an ultrasound signal to the alerting unit and back, and for the delay between receipt of a signal at the alerting unit and transmission of an acknowledgment, plus at least part of the duration of the signals. This means that the ringer control must wait at least 50 mS, assuming the alerting unit is no more than 20 feet from the ringer control microphone and speaker, and a delay of 10 mS is used before the acknowledgment is produced. A shorter delay could be used if it can be guaranteed that the unit will always be less than 20 feet away, and a longer delay would be necessary if a longer range was desired. At the other extreme, there should not be a substantial delay before the ringing signal reaches the user, with more than 1 second beginning to be substantial, although it would be possible to delay up to about 5 seconds before difficulties were encountered because of arrival of a subsequent ring. Thus, 50 milliseconds to 1 second are reasonable boundaries. (Note that if the analog to digital converter 11 is replaced with the components noted above, the microprocessor 12, PROM 13, RAM 14, and digital to analog converters 15 and 20 could be replaced with appropriate control logic, oscillators operating at 20 Hz and 40 kHz, and appropriate amplifiers. The primary advantage of the use of a microprocessor is so similar components can be used in all parts of the system if a microprocessor is used in the alerting units, and perhaps low cost if made in large quantities.)

In the first alternate embodiment, infrared light is used instead of ultrasound as the communications medium for transmission from the ringer control to the alerting units and from the alerting units back to the ringer control. In this case the ultrasonic speaker 6 is replaced with an infrared emitter, and the ultrasonic microphone 9 is replaced with an infrared detectors.

In the second alternate embodiment, radio is used instead of ultrasound as the communications medium for transmission from the ringer control to the alerting units and from the alerting units back to the ringer control. In this case the ultrasonic speaker 6 is replaced with a radio transmitter and antenna, and the ultrasonic microphone 9 is replaced with an antenna and radio receiver.

It is possible for the system to handle more than one incoming telephone line, with different individuals or groups of individuals assigned to different lines. This is frequently handled by having a telephone instrument ring with a distinctive sound for different numbers that are called. In this case each telephone number could be assigned a different pair of ultrasonic frequencies (for the wireless ringing signal and acknowledgment signal), with an individual provided with an alerting unit with receiving and transmitting frequencies for those telephone numbers that user was responsible for. If this is more than one number, a bandpass filter and detector for each number is required.

In cases where the room that the system is installed in is too large for a single ultrasonic speaker and microphone, ultrasonic speakers can be installed throughout the room connected by wire to the amplifier 16 in the ringer control. When this is done, each speaker has installed near it an ultrasonic microphone and amplifier, with the output of each amplifier connected by wire to the signal detector 19 in the ringer control. It would be possible to use the a.c. power line to carry the ultrasonic signal, as is described in the Curtin invention (U.S. Pat. No. 3,657,715). It is also possible to use a combination of radio and either ultrasound or infrared for such a large environment, as is described in the text associated with FIG. 6.

FIGS. 3a and 3b show different physical views of an alerting unit. FIG. 3a shows a front view, indicating the typical combination of an alerting unit with an identification tag displaying the wearer's name, as would be particularly appropriate for a restaurant or retail store, to introduce the wearer to a customer. The unit 22 includes an ultrasonic microphone 23 and ultrasonic speaker 24, and a speaker 25 operating in the normal auditory range to provide a signal to alert the wearer. FIG. 3b shows a side view of the unit 22, showing the ultrasonic microphone 23 and alerting speaker 25. Also shown is a clip 26 that allows the alerting unit to be clipped to the clothing of the user. The clip doubles as a spring-loaded switch, with wires leading to each side of the clip. The jaws of the clip close (as a result of force from the spring) and complete a circuit, should the unit be, for example, placed on a table rather than being worn, preventing the unit from responding when not worn by an individual. This is accomplished by having the clip connect a gate to ground that is normally floating at a positive voltage through a resistor connected to the power supply, with the output of the gate controlling the input of the audio amplifier 34. (see FIG. 4). When clipped to clothing, the circuit is not completed because the fabric acts as an insulator, and the amplifier 34 amplifies, allowing the unit to respond. When not so clipped, the switch closes, completing the circuit, causing the gate to prevent the amplifier 34 from amplifying and thus preventing the unit from responding.

An alternate embodiment adds a microphone to the alerting unit that operates in the ordinary auditory range, and an analog to digital converter and appropriate means in the microprocessor programming to measure the ambient noise level, and the amplitude of the auditory alerting signal is adjusted so that the alerting signal has a greater amplitude in an environment with greater ambient noise, as is described in the Wattenbarger invention (U.S. Pat. No. 4,076,968).

Note that in the case of the alternative embodiment using infrared light, the ultrasonic microphone 23 is replaced by an infrared detector and the ultrasonic speaker 24 is replaced by an infrared emitter. In the case of the alternative embodiment using radio, the ultrasonic microphone 23 is replaced by a radio receiver, while the ultrasonic speaker 24 is replaced by a radio transmitter.

An alternate embodiment makes use of a visual display instead of the alerting speaker 25, in which the alerting unit is clipped to the frame of a pair of eyeglasses and shows a visual display emitted via a blinking light emitting diode located at the side of one of the lenses. Still another alternate embodiment has the alerting unit incorporated into a hat, and has a vibratory unit generate the alerting indication.

FIG. 4 shows the hardware architecture of the alerting unit. An ultrasonic microphone 27 receives the wireless ringing signal from the ringer control, and feeds it into a signal detector 28, which consists of an audio amplifier, active bandpass filter centering around the ringer control transmitting frequency of 40 kHz, integrates the output, and supplies the result to a threshold detector and then to a microprocessor 29. The microprocessor is connected to the programmable read only memory (PROM) 30, which contains a program for control of the alerting unit, storage of values for synthesis of a 48 kHz sine wave for the ultrasonic response, and storage of values for the synthesis of the auditory alerting signal. The random access memory (RAM) 31 stores temporary values of parameters and the input signal while processing. The microprocessor also has associated with it a real-time clock 32, which generates clock pulses for the microprocessor at 2 MHz. The microprocessor sends the digital value of the ultrasonic acknowledgment signal to a digital to analog converter 33, amplifier 34, and ultrasonic speaker 35. Similarly, the microprocessor supplies the digital value of the auditory alerting signal to the same digital to analog converter 33, audio amplifier 37, and sonic frequency speaker 38. Note that the microprocessor 29, RAM 31, PROM 30, and digital to analog converter 33 could be replaced by appropriate control logic and oscillators to generate the required waveforms.

In an alternative embodiment, the amplitude of the alerting signal can be adjusted to take into account the amplitude of the ambient noise level around the alerting unit, so as to provide an alerting signal that alerts the user but is not any louder than necessary to do so. This is described by Wattenbarger in U.S. Pat. No. 4,076,968, for a ringer in a telephone instrument.

An alternative embodiment provides for additional protection against failure of the unit, requiring an additional microphone, operating in the sonic frequency range. When a wireless ringing signal is received, the unit waits until the transmission of the auditory alerting signal and only if it has been generated correctly and received at the sonic microphone is the ultrasonic acknowledgment signal transmitted.

In the alternate embodiment using a visual display, the digital to analog converter 33, audio amplifier 37, and speaker 38 are replaced by a one-bit memory, driver, and light emitting diode. In the alternative embodiment using a vibratory display, the digital to analog converter 33, audio amplifier 37, and speaker 38 are replaced by a motor driver, motor, and object capable of vibrating.

Note that in the case of the alternative embodiment using infrared light, the ultrasonic microphone 27 and signal detector 28 are replaced by an infrared detector and the digital to analog converter 33, amplifier 34, and ultrasonic speaker 35 are replaced by an infrared emitter. In the case of the alternative embodiment using radio, the ultrasonic microphone 27 and signal detector 28 are replaced by an antenna and radio receiver, while the digital to analog converter 33, amplifier 34, and ultrasonic speaker 35 are replaced by a radio transmitter and antenna.

Figure 5:
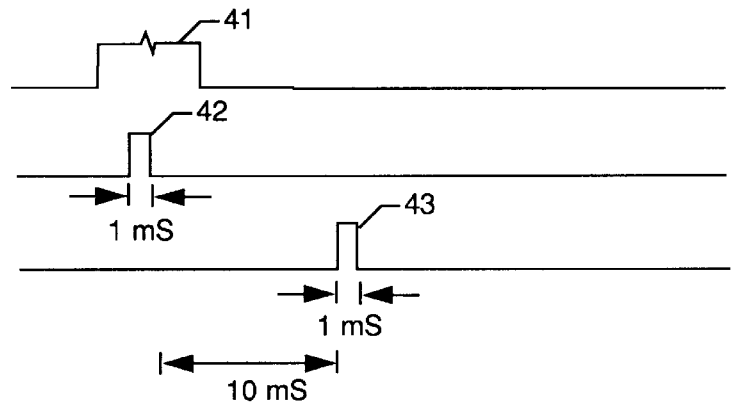
FIG. 5 shows the timing relationships among the different signals.

FIG. 5 shows the timing relationships among the different signals.

A ring signal 41 of up to 2 seconds in duration appears on the telephone subscriber line at the ringer control, and the remainder of events are synchronized to the time that the ring is detected, which is generally about 0.10 seconds after the onset of the ring, or six full cycles at 20 Hz.

A wireless ring signal 42 with a frequency of 40 kHz and a duration of 1 mS is generated beginning at the time of detection of the ring signal 41.

A acknowledgment signal 43 with a frequency of 48 kHz and a duration of 1 mS is generated by the alerting units beginning 10 mS after the end of the wireless ring signal 42 as received at the alerting unit, with the delay to prevent echoes of the wireless ring signal from interfering with the receipt of the acknowledgment signal 43 at the ringer control. Note that there is substantial propagation delay for the ultrasonic signal, at about 1 mS per foot. The effect of this, combined with the relatively short signal duration, is to add a random delay before the receipt of the acknowledgment signal at the ringer control, which, because different alerting units are likely to be in different places and thus introduce different delays, makes it unlikely for one unit to transmit a signal at exactly the same time as another. This reduces the already small possibility of interference that could result in two units transmitted the same signal at the same time and in the worst phase relationship. Shortening the duration of the signal generated by the alerting unit, to below 1 mS, could reduce the probability of interference even more and also reduce the drain on the battery of the alerting unit.

Figure 6:
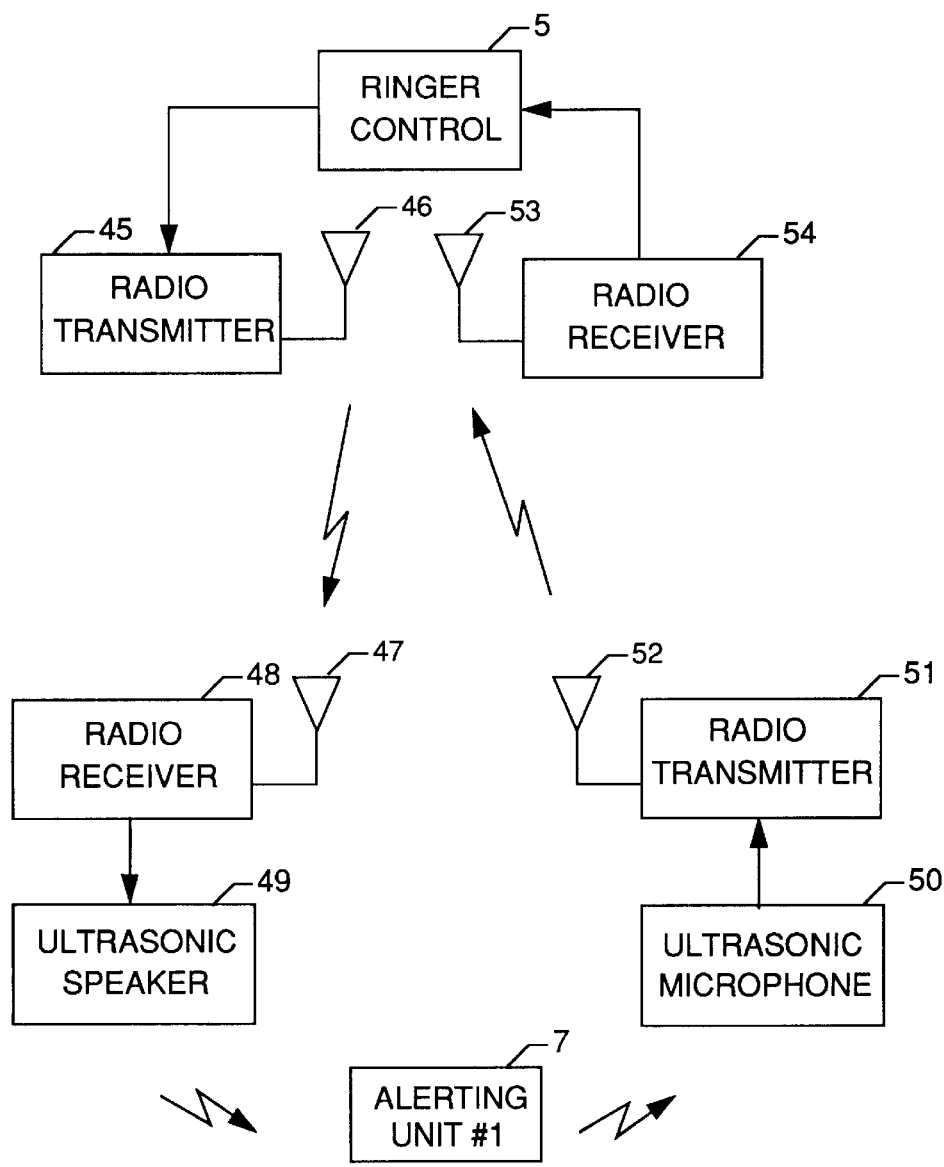
FIG. 6 shows the architecture of an alternate embodiment that uses a combination of ultrasound and radio to communicate with the alerting units.

FIG. 6 shows the architecture of an alternate embodiment that uses a combination of ultrasound and radio to communicate with the alerting units.

The ringer control 5 uses its ultrasonic output (a wireless ring signal) to modulate a radio transmitter 45, which is amplitude modulated. The output of the transmitter is supplied to an antenna 46, and the signal propagates to a set of remote stations, with each remote station located in a different part of the room or rooms the system is installed in. The architecture of one remote station is shown in FIG. 6, consisting of an antenna 47, radio receiver 48, and ultrasonic speaker 49 for the part that receives a wireless ring signal and broadcasts it via ultrasonic sound, and an ultrasonic microphone 50, radio transmitter 51 (including amplifiers and modulators), which receives the acknowledgment signal from an alerting unit and feeds the resulting modulated radio signal to antenna 52. The radio version of the acknowledgment signal is received at antenna 53 at the ringer control and is passed to the radio receiver 54 and then to the signal detector and microprocessor.

In a variation of the alternate embodiment shown in FIG. 6, infrared light is used instead of ultrasound as the medium for communication between the remote stations and the alerting units. Note that the two media of infrared light and ultrasonic sound form a class of radiated energy that has as its primary common characteristic the inability to penetrate walls, ceilings, floors, and doors, the ability to be reflected by walls, ceilings, floors, and doors, and relatively short-range transmission capabilities when used at the power levels practical with miniature, battery operated devices. These media are particularly useful (in contrast to radio) when it is desirable for alerting units to only respond if the user is in the same room as the ringing control unit and thus likely to be able to answer the incoming call.

I claim:

1. An apparatus for alerting an individual to an incoming telephone call at a telephone subscriber premises, comprising:

a ringer control located at said telephone subscriber premises, comprising:

a sensor for detecting a ringing signal on a telephone subscriber line;

a transmitter for transmitting a wireless ringing signal indicating the receipt of said ringing signal at said telephone subscriber line, in which said wireless ringing signal is transmitted by the propagation of wave-based energy directly through air;

a receiver and signal detector for receiving and detecting a signal by the propagation of wave-based energy directly through the air;

a generator of an auditory ringing signal and providing it to a ringer; and a control mechanism that initiates generation of said auditory ringing signal, should a wireless ringing signal be transmitted and an acknowledgment signal not be received after a given period of time;

one or more alerting units, with each alerting unit comprising:

a receiver that receives the wireless ringing signal by the propagation of wave-based energy directly through the air;

a transmitter that transmits said acknowledgment signal by the propagation of wave-based energy directly through the air;

a transducer for providing a humanly perceptible signal to an individual carrying the alerting unit upon receipt of the wireless ringing signal;

a control mechanism that initiates transmission of said humanly perceptible signal and transmission of the acknowledgment signals; and a combination clip and switch contained in the alerting unit configured so as to prevent the alerting unit from transmitting the acknowledgment signal, should the alerting unit not be clipped to a user's clothing; and a ringer located at said telephone subscriber premises for accepting a ringing signal and converting it to sound that is perceptible by humans.

2. The apparatus of claim 1, wherein the combination clip and switch contained in the alerting unit detects that the alerting unit is not clipped to a user's clothing when the two jaws of the clip touch.

* * * * *